THIN FILM RESISTOR AND PREPARATION THEREOF

Filed Oct. 28, 1968 2 Sheets-Sheet 1

INVENTOR
G. I. PARISI
BY Edward M. Fink
ATTORNEY

Jan. 26, 1971 G. I. PARISI 3,558,461

THIN FILM RESISTOR AND PREPARATION THEREOF

Filed Oct. 28, 1968 2 Sheets-Sheet 2

United States Patent Office 3,558,461

Patented Jan. 26, 1971

3,558,461

THIN FILM RESISTOR AND PREPARATION THEREOF

George I. Parisi, Murray Hill, N.J., assignor to Bell Telephone Laboratories, Incorporated, Murray Hill and Berkeley Heights, N.J., a corporation of New York Filed Oct. 28, 1968, Ser. No. 771,001

Int. Cl. C23c *15/00*

U.S. Cl. 204—192 5 Claims

ABSTRACT OF THE DISCLOSURE

Thin film tantalum based resistors evidencing a temperature coefficient of resistance of —200 p.p.m./° C. and the attributes of tantalum nitride ($Ta_2N$) resistors are obtained by reactive sputtering of tantalum in the presence of oxygen and nitrogen followed by anodization and thermal pre-aging of the resultant deposited film. Resistors so fabricated match the positive temperature coefficient of capacitance of β-tantalum capacitors, thereby permitting the preparation of tantalum nitegrated circuits with a small and constant frequency response over a wide range of temperature.

Figure 1:
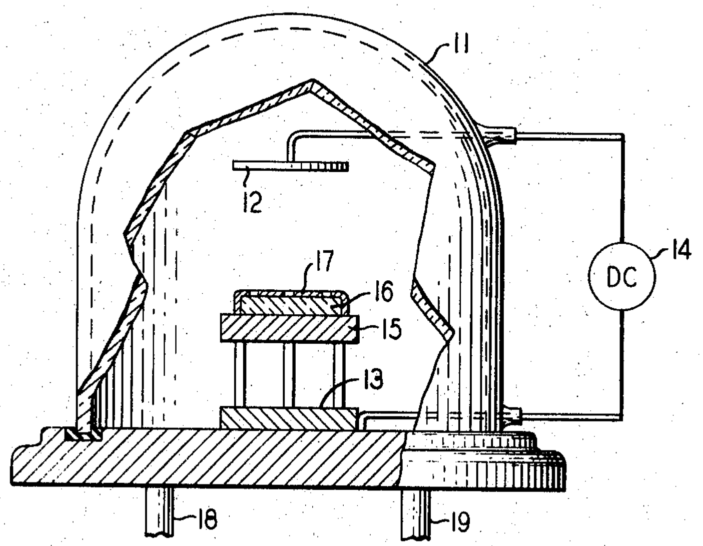

This invention relates to a method for the fabrication of tantalum based film resistors and to the resistors so produced.

In recent years the miniaturization of components in circuitry has been a major development activity in the electronics industry. Particular emphasis has been placed upon the development of thin film resistor materials which evidence the combined properties of desirable specific resistivity, a low temperature coefficient of resistance and high thermal stability.

Among the more promising materials developed thus far have been (a) the tantalum nitride resistor described by D. Gerstenberg in U.S. Pat. 3,242,006, issued Mar. 22, 1966, obtained by reactively sputtering tantalum in the presence of nitrogen, and (b) the tantalum resistor comprising an amorphous mixture of tantalum and tantalum pentoxide described by W. J. Pendergast in U.S. Pat. 3,258,413, issued June 28, 1966, obtained by reactively sputtering tantalum in the presence of oxygen. Although these materials have satisfactorily fulfilled the need for extremely reliable precision resistors with low temperature coefficients of resistance and high stability, they have not proven entirely satisfactory in all applications. Thus, in integrated circuitry wherein a negative temperature coefficient of resistance of —200 p.p.m./° C. is often required to compensate for the positive temperature coefficient of capacitance of β-tantalum capacitors, the integrated circuit designer has had to accept the limited temperature coefficient of resistance range of tantalum nitride ($Ta_2N$) films with the concomitant loss in performance or introduce additional circuitry to circumvent the problem. The amorphous films of tantalum-tantalum pentoxide have to some extent fulfilled this need, for the desired temperature coefficient of resistance of the order of —200 p.p.m./° C. can be obtained. However, stability and reproducibility degrade to a point sufficient to render the films unacceptable.

In accordance with the present invention, a technique is described for preparing tantalum based film resistors by successively depositing a thin film of tantalum oxynitride on a suitable substrate by reactive sputtering of tantalum in an atmosphere of oxygen and nitrogen, anodizing the deposited film and stabilizing the resultant structure by heating in air.

The inventive technique described herein results in an anodizing product evidencing a range of temperature coefficients of resistance from —50 to —500 p.p.m./° C. and specific resistivities ranging from 300 to 1500 microhm centimeters. The availability of tantalum films evidencing the attributes of stability, anodizability, as well as reproducibility and a temperature coefficient of resistance of the order of —200 p.p.m./° C. permits matching of the temperature coefficient of capacitance of β-tanalum capacitors and the fabrication of tantalum integrated circuits with a small and constant frequency response with temperature.

The invention will be more readily understood from the following detailed description taken in conjunction with the accompanying drawings wherein:

FIG. 1 is a front elevational view partly in section of an apparatus suitable for use in producing a film of tantalum oxynitride by reactive sputtering of tantalum in accordance with the present invention.

Figure 2:
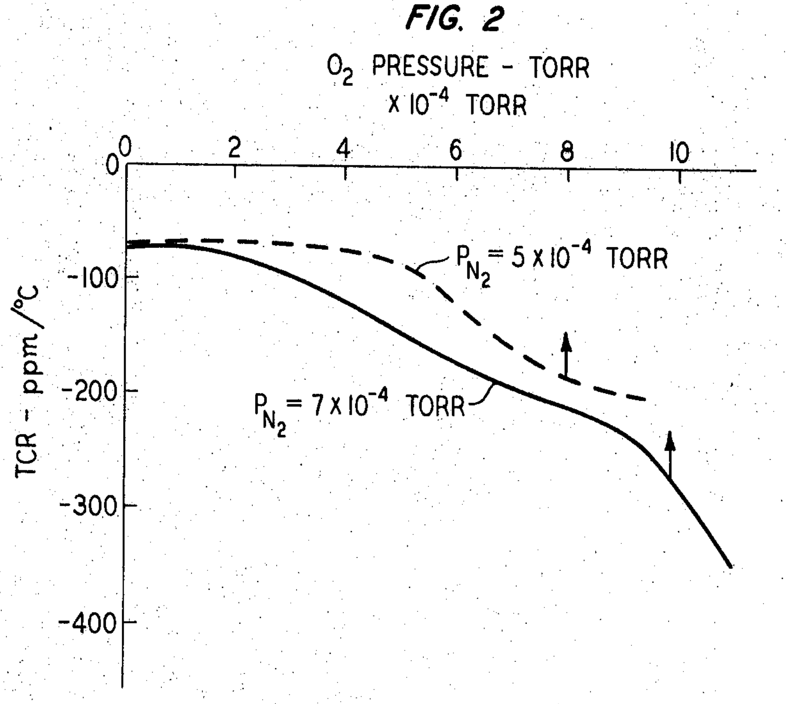
Figure 3:
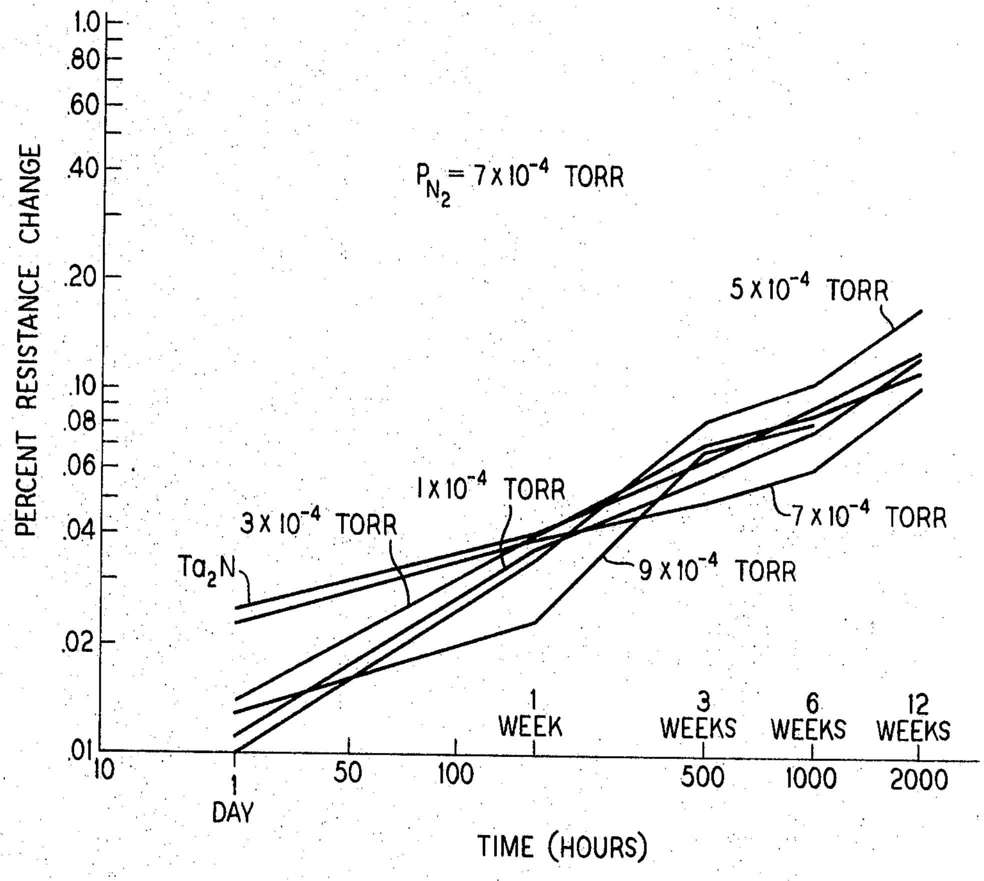

FIG. 2 is a graphical representation on coordinates of temperature coefficient of resistance in p.p.m./° C. against oxygen partial pressure in torr and the sum of the nitrogen and oxygen partial pressures in torr showing variations in temperature coefficient of resistance over a range of temperatures from 0–100° C. of resistors prepared from tantalum films sputtered with various oxygen and nitrogen partial pressures with a total argon pressure of 20 microns with subsequent anodization at 100 volts and thermal pre-aging in air at 250° C. for five hours; and FIG. 3 is a graphical representation on coordinates of resistance change in percentage against time in hours showing variations in resistance obtained by accelerated thermal aging without power for resistors sputtered in accordance with the present invention at various oxygen partial pressures and a partial pressure of nitrogen equal $7\times10^{-4}$ torr.

With reference now more particularly to FIG. 1, there is shown an apparatus suitable for depositing tantalum films by reactive sputtering. Shown in FIG. 1, is a vacuum chamber 11 in which are disposed cathode 12 and anode 13. Cathode 12 may be composed of tantalum or, alternatively, may serve as the base for the tantalum which later may be in the form of a coating foil or other suitable physical form.

A source of electrical potential 14 is shown connected between cathode 12 and anode 13. Platform 15 is employed as a positioning support for substrate 16 upon which the sputtered film is to be deposited. Sputtering shield 17 is placed upon substrate 16 to restrict the deposition during the presputtering period. Conduits 18 and 19 are provided for introducing nitrogen and oxygen into the system.

The present invention is conveniently described in detail by reference to an illustrative example in which tantalum is employed as cathode 12 in the apparatus shown in FIG. 1.

Preferred substrate materials for this invention are glasses, glazed ceramics, and so forth. These materials meet the requirements of heat resistance and conductivity essential for substrates utilized in reactive sputtering techniques.

Substrate 16 is first vigorously cleaned, conventional cleaning agents being found suitable. The choice of a specific cleansing agent is found to be dependent upon the composition of the substrate itself. For example, where the substrate consists of glass, boiling in aqua regia or hydrogen peroxide is a conventional method for cleaning the surface.

Substrate 16 is placed upon platform 15 as shown in FIG. 1 and shield 17 is then suitably positioned. Platform 15 and shield 17 may be fabricated from any refractory material.

The vacuum chamber is next evacuated and nitrogen and oxygen are admitted thereto at a dynamic pressure, and after attaining equilibrium, argon is admitted. For purposes of the present invention it has been found that the partial pressures of oxygen and nitrogen must be maintained within certain critical ranges in order to yield a resistive film manifesting the desired properties. Thus, the partial pressure of nitrogen must be maintained within the range of 5 to $7\times10^{-4}$ torr and the partial pressure of oxygen must be maintained within the range of 1 to $11\times10^{-4}$ torr. An optimum has been found to exist at partial pressures of nitrogen of $5\times10^{-4}$ torr and oxygen partial pressures of $9\times10^{-4}$ torr, or at nitrogen and oxygen partial pressures of $7\times10^{-4}$ torr, such optimums yielding the desired temperature coefficient of resistance of −200 p.p.m./° C. Experimentation has revealed that the use of nitrogen partial pressures less than $5\times10^{-4}$ torr result in a degradation in the stability of the resultant film, whereas partial pressures in excess of $7\times10^{-4}$ torr degrade the anodizability of the resistive film. Similarly, the use of oxygen partial pressures less than $1\times10^{-4}$ torr result in temperature coefficient of resistance closely akin to that of tantalum nitride. The maximum partial pressure of oxygen is dictated by considerations relating to the resistivity required in thin film integrated circuitry, it being found that partial pressures beyond $11\times10^{-4}$ torr result in a highly resistive film which is unacceptable for the applications described herein. The extent of the vacuum employed in the operation of the described process is dependent upon consideration of several factors.

Increasing the inert gas pressure and thereby reducing the vacuum within chamber 11 increases the rate at which the tantalum being sputtered is removed from the cathode and thus increases the rate of deposition. The maximum pressure is usually dictated by power supply limitations since increasing the pressure also increases the current flow between cathode 13 and anode 12. A practical upper limit in this respect is $25\times10^{-3}$ torr for a sputtering voltage of 6600 volts, although it may be varied depending upon the size of the cathode, sputtering, rate, and so forth. The ultimate maximum pressure is that at which the sputtering can be reasonably controlled within the prescribed tolerances. It follows from the discussion above that the minimum pressure is determined by the lowest deposition rate which can be economically tolerated. After the requisite pressure is attained, cathode 12 is made electrically negative with respect to anode 13.

The practical minimum voltage necessary to produce sputtering is about 2000 volts. Increasing the potential difference between anode 13 and cathode 12, has the same effect as increasing the pressure, that of increasing both the rate of deposition and the current flow. Accordingly, the maximum voltage is dictated by consideration of the same factors controlling the maximum pressure.

The spacing between anode and cathode is not critical. However, the minimum separation is that required to produce a glow discharge which must be present for sputtering to occur. Many dark striations are well known and have been given names as, for example, Crookes Dark Space. For the best efficiency during the sputtering step, substrate 16 should be positioned immediately without Crookes Dark Space on the side closest to anode 13. Location of substrate 16 closer to cathode 12 results in a film deposit of poorer quality. Locating substrate 16 further from cathode 12 results in the impingement on the substrate by a smaller fraction of the total metal sputtered, thereby increasing the time necessary to produce a deposit of given thickness.

It should be noted that the location of Crookes Dark Space changes with variations in the pressure, it moving closer to the cathode with increasing pressure. As the substrate is moved closer to the cathode, it tends to act as an obstacle in the path of gas ions which are bombarding the cathode. Accordingly, the pressure should be maintained sufficiently low so that Crookes Dark Space is located beyond the point at which a substrate would cause shielding of the cathode.

The balancing of these various factors of voltage, pressure and relative positions of the cathode, anode and substrate to obtain a high quality deposit is well known in the sputtering art.

With reference more particularly to the example under discussion, by employing a proper voltage, pressure and spacing of the various elements wtihin the vacuum chamber, a layer of a tantalum oxynitride film is deposited, sputtering being conducted for a period of time calculated to produce the desired thickness. For the purposes of the present invention, the minimum thickness of the layer deposited upon the substrate is approximately 400 A. There is no maximum limit on this thickness although little advantage is gained by an increase beyond 2000 A.

Referring now to FIG. 2, there is shown a graphical representation on coordinates of temperature coefficient of resistance in p.p.m./° C. against reactive gas pressure for tantalum films sputtered with a total argon pressure of approximately 20 microns and varying partial pressures of oxygen and nitrogen. Subsequent to deposition, the films were anodized to 100 volts and thermally preaged in air for five hours. The temperature coefficient of resistance determinations were made by measuring resistance near temperatures at which such films would be employed in device applications, determinations being made at temperatures between 0 and 100° C.

Analysis of the graphical data reveals that a full range of temperature coefficients of resistance may be obtained at nitrogen partial pressures of $5\times10^{-4}$ torr and $7\times10^{-4}$ torr over a range of oxygen partial pressures of from 1 to $11\times10^{-4}$ torr. It will be noted that in order to obtain the desired temperature coefficient of resistance of approximately −200 p.p.m./° C. a nitrogen partial pressure of $5\times10^{-4}$ torr in conjunction with an oxygen partial pressure of approximately $9\times10^{-4}$ torr may be employed. It will also be noted that this desirable level can be obtained at the higher nitrogen partial pressure utilizing a slightly lower oxygen partial pressure.

With reference now to FIG. 3, there is shown a graphical representation on coordinates of percent change in resistance against time in hours showing variations in resistance for tantalum films sputtered in accordance with the present invention at nitrogen partial pressures of $7\times10^{-4}$ torr and various oxygen partial pressures ranging from 1 to $11\times10^{-4}$ torr. For comparative purposes, data for tantalum nitride ($Ta_2N$) were also plotted upon the graph. Stability measurements were made by accelerated thermal aging without power at 85° C. and 150° C. Analysis of the data presented reveals that there is substantially little difference in stability between the films described herein and the conventional tantalum nitride film and, in fact, it will be noted that some of the films described herein evidence superior stability as compared with tantalum nitride.

With reference once again to the illustrative example under discussion, the substrate is maintained at temperatures within the range of 100°–500° C. during the reactive sputtering. Temperatures below 100° C. result in poor adherence of the film to the substrate due to out-gassing of the substrate, whereas temperatures appreciably beyond 500° C. adversely affect stability.

Following the deposition technique, the resultant film is anodized for the purpose of adjusting the value of resistance to a desired level, such technique being described in U.S. Pat. 3,148,129 granted to H. Basseches et al., said patent being incorporated herein by reference.

Next, the anodized films are heated in the presence of air at temperatures within the range of 200°–300° C. for a time period within the range of 1 to 5 hours, thereby stabilizing said films.

An example of the present invention is described in detail below. This example and the illustration described above are included merely to aid in the understanding of the invention and variations may be made by one skilled in the art without departing from the spirit and scope of the invention.

EXAMPLE

A reactive sputtering apparatus similar to that shown in FIG. 1 was used to produce a tantalum oxynitride film. The cathode consisted of a circular tantalum disc 100 mils thick and 14 inches in diameter. In the apparatus actually employed, the anode was ungrounded, the potential difference being obtained by making the cathode negative with respect to ground.

A glass microscope slide, approximately 1" in width and 3" in length was used as a substrate. The slide was then cleaned using the following procedure. The slide was first washed in a detergent such as "Igepal" to remove large particles of dirt and grease and vigorously washed in tap water for several minutes followed by a deionized water rinse.

The vacuum chamber was evacuated by means of a roughing pump and an oil diffusion pump to a pressure of $2\times10^{-6}$ torr after a time period within the range of 1 to 2 hours. Next, the substrate was heated to a temperature of approximately 450° C. After obtaining such temperature, oxygen and nitrogen were admitted into the chamber at dynamic pressure and after attaining equilibrium, argon was admitted into the chamber for a pressure of 20 microns. During the sputtering operation, the partial pressures of nitrogen and oxygen were maintained at $5\times10^{-4}$ torr and $9\times10^{-4}$ torr, respectively.

The anode and cathode were spaced approximately 3¼" apart, the clean substrate being placed therebetween at a position immediately without the Crookes Dark Space. Sputtering was initiated by impressing a D-C voltage of 6600 volts between the cathode and anode. In order to establish equilibrium when first initiating the sputtering, it was found helpful to sputter on a shield for 15 minutes, thereby assuring reproducible results. Sputtering was conducted for approximately 10 minutes, so resulting in a layer of 1800 A. of a film of tantalum oxynitrile. Electrical measurements were made at each stage of treatment of the resistor.

Next, the sputtered film was anodized at 100 volts utilizing an electrolyte consisting of an aqueous citric acid solution, 0.01 percent, by weight. The anodized resistor was then thermally pre-aged by heating in air at 250° C. for five hours, followed by an additional trim anodization equal to 10 percent of the initial anodization. Stability was determined by thermal aging at both 85° C. and 150° C. with no load. The resultant resistive film evidenced a temperature coefficient of resistance of —200 p.p.m./° C., a resistivity of approximately 650 microhm centimeters and stability comparable to that of tantalum nitride.

What is claimed is:

1. A method for the fabrication of tantalum based film resistor comprising the steps of depositing a thin film of tantalum oxynitride upon a substrate by reactive sputtering in the presence of oxygen, nitrogen and inert gas, the partial pressure of oxygen ranging from $1\times10^{-4}$ to $11\times10^{-4}$ torr, the partial pressure of nitrogen ranging from $5\times10^{-4}$ to $7\times10^{-4}$ torr, the total pressure being less than about $20\times10^{-3}$ to $25\times10^{-3}$ torr, until the said film has a thickness of at least 400 A., anodizing said deposited film to increase the resistance thereof and stabilizing said anodized film by heating in air.

2. A method in accordance with claim 1 wherein the partial pressure of oxygen is $9\times10^{-4}$ torr.

3. A method in accordance with claim 1 wherein the partial pressure of nitrogen is $5\times10^{-4}$ torr.

4. A method in accordance with claim 1 wherein the partial pressures of oxygen and nitrogen are $7\times10^{-4}$ torr.

5. Resistor produced in accordance with the method of claim 1.

References Cited

UNITED STATES PATENTS

| | | | |
|---|---|---|---|
| 3,258,413 | 6/1966 | Pendergast | 204—192 |
| 3,242,006 | 3/1966 | Gerstenberg | 204—192 |

JOHN H. MACK, Primary Examiner

S. S. KANTER, Assistant Examiner

U.S. Cl. X.R.

117—106